Oct. 2, 1956  J. E. ANTONIDIS  2,765,133
MOUNTING FOR DYNAMO-ELECTRIC UNIT
Filed March 16, 1953

INVENTOR.
John E. Antonidis
Attorney

Oct. 2, 1956  J. E. ANTONIDIS  2,765,133
MOUNTING FOR DYNAMO-ELECTRIC UNIT

Filed March 16, 1953  2 Sheets-Sheet 2

INVENTOR.
John E. Antonidis
BY
Attorney

United States Patent Office 2,765,133
Patented Oct. 2, 1956

2,765,133

MOUNTING FOR DYNAMO-ELECTRIC UNIT

John E. Antonidis, Anderson, Ind., assignor to General Motors Corporation, Detroit, Mich., a corporation of Delaware Application March 16, 1953, Serial No. 342,529

1 Claim. (Cl. 248—2)

This invention relates to dynamo-electric units and more particularly to a mounting structure adapted for maintaining the unit in any one of a plurality of angular positions with reference to a supporting structure.

Dynamo-electric units of the present day are employed in a wide variety of installations, one of the most common uses of these being in connection with an internal combustion engine where the unit serves as an actuator for the starting mechanism. When serving in this capacity the current practice is to mount the unit to a drive housing which in turn is connected to a flywheel housing. When thus mounted the unit operates in conjunction with a gear mounted on the flywheel through a starter drive contained in the unit housing to provide the cranking force to the engine.

It is apparent the different types of engines, or for that matter the same engine model in different installations, will require the starters to be mounted on either the right or the left side of the engine. Thus formerly it has been necessary for service stations and garages to carry both left and right hand models of dynamo-electric units, which were otherwise alike in all other respects, to provide replacement parts for the various engine model starters.

The present practice, when such mechanism fails, is to replace the old worn out unit with a new unit and to "trade" in the old unit so that it may be rebuilt. Thus each garage and service station is required to stock both right and left hand models and hence twice the number of units, as otherwise would be necessary, so that complete repairs for all engine models can be made.

It is therefore an object of the present invention to reduce the number of replacement units required to be stocked by providing a mounting structure for a dynamo-electric unit whereby the unit may be mounted in a plurality of angular positions, so as to accommodate said right and left hand mountings.

It is a further object of this invention to provide a mounting structure for a dynamo-electric unit, particularly an engine starter, which is adapted to mount the unit in one of a predetermined number of angular positions. This object is materialized by providing a two part gear housing having cooperating means on each portion which permit the unit to be rotated to the desired angular position and there maintained when said cooperating means are secured.

A more specific object of the present invention is to provide an engine starter mounting structure adapted to maintain the starter in a selected predetermined angular position with reference to a support. This object is accomplished by providing a member attached to a support structure and a member attached to a starter. Each of said members cooperating with the other and having a plurality of radially and equidistantly spaced holes located at an equal distance from a center, said holes being suitable for receiving securing bolts, thus providing a plurality of positions whereby the starter may be selectively maintained with reference to the support.

Another object of the present invention is to provide a structure for maintaining the starting motor of an engine in a predetermined angular relation with the support. This object is accomplished by providing a member having a plurality of longitudinal splines on a peripheral portion thereof, and a second member having a flange with internal grooves formed thereon. Said grooves being adapted for cooperation with the splines whereby the members may be rotated, interlocked and thus maintained in a predetermined angular relation to each other for positioning the starter with reference to the support.

Further objects and advantages of the present invention will be apparent from the following description reference being had to the accompanying drawings wherein a preferred embodiment of the present invention is clearly shown.

Figure 6:
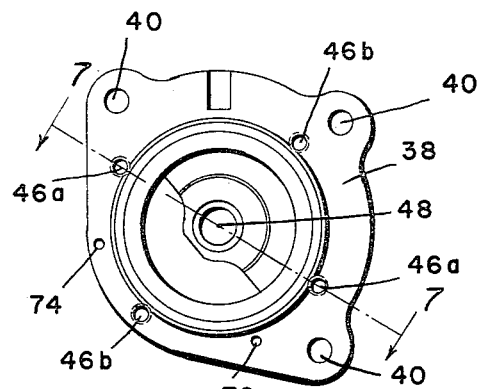
Fig. 6 is an end view of the housing as indicated by line 6—6 in Fig. 1.
Figure 7:
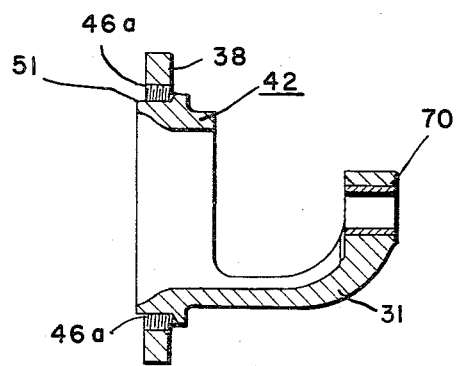

Fig. 7 in section shows a portion of the gear housing on the line 7—7 in Fig. 6.

Figure 8:
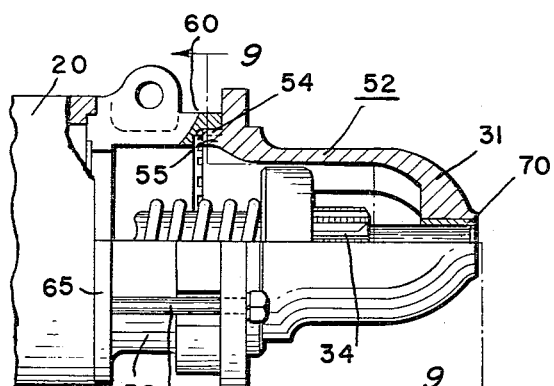

Fig. 8 in partial section shows one modification of the present invention.

Figure 9:
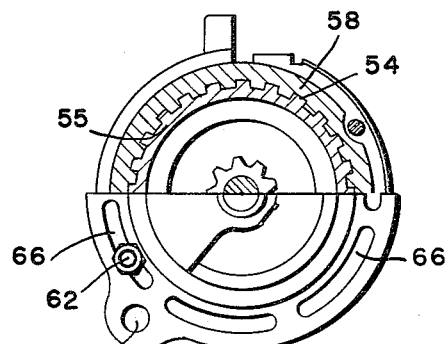

Fig. 9 in partial section is a view indicated by line 9—9 in Fig. 8.

Figure 1:
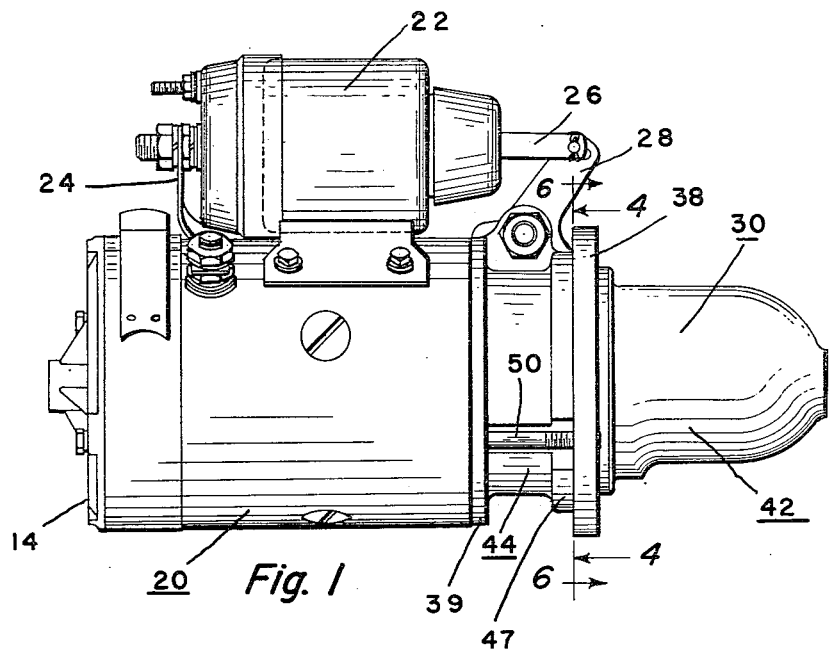
Fig. 1 is a side elevation of an engine starter with a gear housing attached.

In the drawings and in Fig. 1 particularly, reference number 20 designates a dynamo-electric unit adapted to be used as an electric cranking motor in connection with an internal combustion engine, not shown. The cranking motor or starter 20 is of the conventional type and is actuated through a solenoid 22 which, upon being excited causes movement of plunger 26 to the left as viewed in Fig. 1 while closing a relay internally carried within the solenoid 22 for supplying current through conductor 24 to the electrical windings of the starter 20 while simultaneously moving lever 28 connected to the solenoid plunger 26 and pivoted on the drive housing 30 to actuate a conventional starter driving mechanism (Fig. 8), wherein a pinion gear 34, located within the housing 30 is brought into engagement with a gear carried by a flywheel located in a flywheel housing (not shown).

Figures 2, 3:
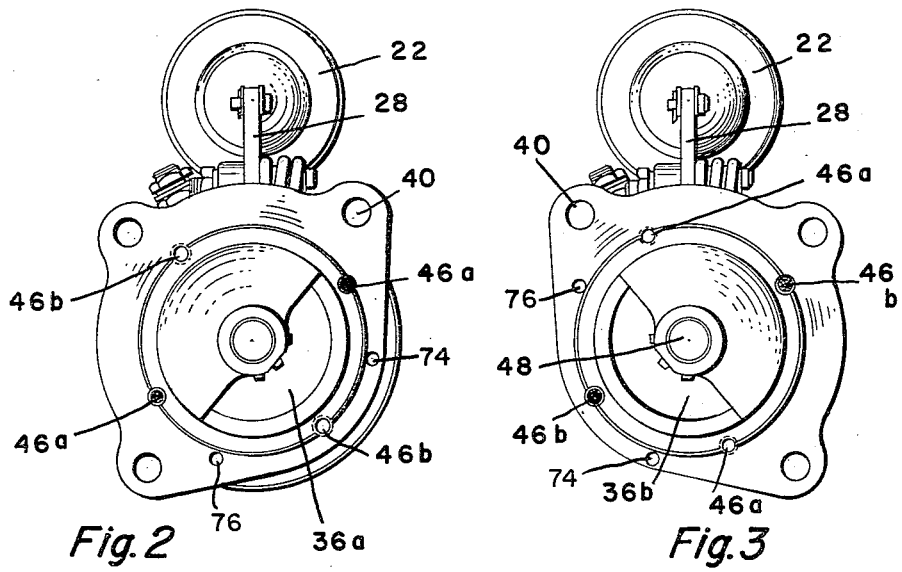
Fig. 2 is an end view of an engine starter, wherein the starter is shown as adapted for mounting in a right hand position on an engine.
Fig. 3 is a view similar to Fig. 2 wherein the starter is shown in a left hand position.

A conventional starter may be mounted on either the right side, Fig. 2, or the left side, Fig. 3 of an engine, by means of the drive housing 30 which has a flange portion 38 provided with holes 40 adapted to receive stud bolts, not shown, for securing the drive housing 30 to the flywheel housing.

As it previously indicated the conventional starter may be of either the right or left handed type as shown in either Figs. 2 or 3 of the drawings. The only difference in the parts is the location of openings 36a and 36b respectively in housing 30. These openings 36a and/or 36b are provided to accommodate the flywheel gear, not shown, which when actuated by pinion gear 34 located within the drive housing 30 cranks the engine.

Figure 5:
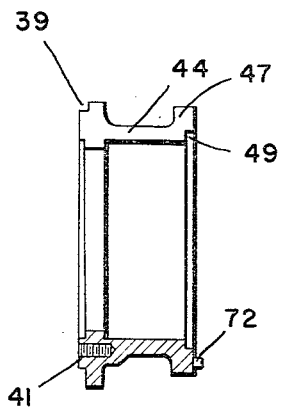
Fig. 5 is a side view as indicated by the line 5—5 in Fig. 4.
Figure 4:
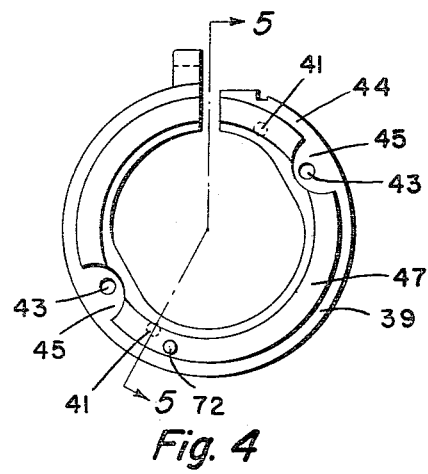
Fig. 4 is an end view as indicated by the line 4—4 of Fig. 1.

The present invention is directed to a mounting structure for a starter whereby the unit may be mounted on either side of the engine. This objective is accomplished by providing a gear housing and supporting structure having two mating sections 42 and 44 adapted to be secured after being relatively rotated to each other, Section 44 a sleeve-like member, has a flange 39 formed on one end including a pair of oppositely disposed tapped holes 31 provided therein (Figs. 4 and 5). These holes 41 are adapted to receive threaded mounting bolts, not shown, having head portions engaging a flange 14 on the left end of the starter and shank portions which pass through the starter body, thereby securing the various portions of the starter together while maintaining section 44 in position thereon. A second flange portion 47, is provided on the other end of section 44. This flange 47 has portions thereof cut away to form oppositely disposed notches 45 therein. These notches 45 are axially aligned with holes 43 (Fig. 4) provided in flange 39. The purpose and alignment of the holes 43 and notches 45 will hereinafter become apparent.

Section 42 has a flange 38 thereon having a plurality of radially spaced holes (Fig. 6) provided therein. These holes are adapted to receive bolts which threadedly engage holes in the flywheel housing and thereby fasten the section 42 thereto. When the section 42 is in a mounted position, it has a portion 31 (Fig. 7) thereof extending within the flywheel housing. This portion 31 provides a support for a journal bearing 70 (Fig. 8) that carries a shaft having pinion gear 34 mounted thereon. The gear 34 is adapted to engage a gear mounted on the flywheel, the purpose of which has been heretofore set forth. Flange 38 also has a plurality of radially spaced tapped holes 46a and 46b (Figs. 6 and 7) formed therein. These holes in the prefered embodiment are located at 90° from one another and are arranged in axial alignment with holes 43 and notches 45 in section 44 when sections 42 and 44 are in a predetermined radial position.

To facilitate the radial positioning of sections 42 and 44 a locating pin 72 is provided in section 44 (Fig. 5) and locating holes 74 and 76 (Fig. 6) are provided in section 42. When the locating pin 72 is inserted in hole 74 the sections will be properly positioned for mounting the starter unit in the position shown in Fig. 1; wherein one pair of holes 46a are utilized. When locating hole 76 is employed in conjunction with pin 72 the starter unit will be mounted in the position shown in Fig. 3 and another pair of holes 46b will be used to secure the sections 42 and 44 together.

As has been heretofore stated the holes 43, the notches 45 and a selected pair of holes 46a or 46b are all in axial alignment when the locating pins engage one of the two holes 74 and 76 of section 42. When the members are so positioned a pair of bolts 59 may be inserted through the cap 14 and pass through the starter and engage the threads provided in holes 46 (a or b) for securing the mounting sections 42 and 44 in axial and radial alignment. To further aid the securement of sections, section 44 has a counterbore 49 on the flange 47 and section 42 a projection 51 adapted to seat within the counterbore 49. When the sections are thus secured a rigid unitary structure will result.

It is apparent more than two pairs of tapped holes may be provided in either of the sections 42 or 44 and thereby provide a mounting structure adapted for positioning the unit in more than two angular positions. When the plurality of holes are so employed, they should be located so that a pair of holes at least engage a corresponding amount of holes in the other member, thereby providing a rigid structure suitable for use as a mounting structure and gear housing.

A modification of the mounting for a starter unit is shown in Figs. 8 and 9 of the drawings wherein a section 52 of the drive housing is adapted to be secured to the flywheel housing as outlined above. This portion 52 has splines 54 formed on the peripheral portion of a flange 55. A second portion 56 which is adapted to mate with portion 54 and be secured as outlined above to the starter unit has internally formed grooves 58 located on a flange portion 60. The grooves 58 and splines 54 on the respective portions are constructed and arranged for cooperation with one another so that the respective portions 52 and 56 may be rotated to any desired position and there secured with a fastening nut 62 which is threaded upon bolt 50 which extends through suitable holes and notches in member 56 and arcuate slots 66 in member 52. The slots 66, as provided in member 52, permit a limited rotation of member 52 with reference to member 56 whereby the splines 54 may be aligned within the grooves 58 before being secured. Thus it is apparent that member 52 may be rotated with reference to member 56 to any desired position and the splines 54 when inserted in grooves 58 may be there maintained by a fastening means comprising bolt 50 and its cooperating nut 62. It is apparent that the disposition of the spline and mating grooves may be reversed so that the part 52 will carry grooves and the part 56 carries the splines.

From the foregoing it is apparent that the conventional starter may be positioned on the left or right side of an engine in any one of a plurality of positions and serve as cranking mechanism, if the mounting structure according to the present invention is employed. This construction is particularly desirable when the starter and solenoid are to be used as a replacement part and are required to fit exactly the proper location. The housing disclosed is also useful where small production quantities of several particular mountings are required, for the necessity of having a plurality of patterns is eliminated, and a considerable reduction in production and storage costs is thereby realized.

While the embodiment of the present invention as herein disclosed constitutes a preferred form, it is to be understood that other forms might be adopted.

What is claimed is as follows:

A mounting structure for mounting a dynamo-electric unit in a plurality of angular positions relative to a drive housing having a drive gear therein accessible from one side only of said housing, comprising in combination; an internal peripheral shoulder at one end of said unit, an axially extending flange integral with and adjacent one end of said housing and having a plurality of splines thereon, a first radially extending flange integral with said housing adjacent said axially extending flange and having a plurality of arcuately-shaped openings therein, a sleeve-like member including an axial extension at one end seated on said shoulder of said unit and a plurality of circumferentially spaced grooves in the other end mating with said splines when said unit and said housing are in assembled relation in one of a plurality of predetermined angular positions, further radially extending flanges at each of the said ends of said member, one of said further flanges having at least two circumferentially spaced apertures therein and the other of said further flanges having cut-out portions in axial alignment with said apertures, and a pair of bolts extending through said unit, said apertures, said cut-out portions and said arcuately-shaped openings and securing said unit, said member and said housing in assembled relation.

References Cited in the file of this patent

UNITED STATES PATENTS

| | | |
|---|---|---|
| 1,288,136 | Neuteboom | Dec. 17, 1918 |
| 1,359,600 | Ilg | Nov. 23, 1920 |
| 1,701,649 | Vogel | Feb. 12, 1929 |
| 1,832,938 | Leach | Nov. 24, 1931 |
| 2,181,127 | Ferguson | Nov. 28, 1939 |
| 2,450,422 | Elks | Oct. 5, 1948 |
| 2,506,239 | Sears | May 2, 1950 |
| 2,510,680 | Byrnes | June 6, 1950 |
| 2,578,094 | Sears | Dec. 11, 1951 |

FOREIGN PATENTS

| | | |
|---|---|---|
| 635,488 | France | Dec. 28, 1927 |